United States Patent Office 3,592,904
Patented July 13, 1971

3,592,904
METHOD OF TREATING INFLAMMATORY DISEASES
Delme Evans, Sandhurst, England, assignor to Lilly Industries, Ltd., London, England
No Drawing. Filed July 7, 1969, Ser. No. 839,682
Claims priority, application Great Britain, July 5, 1968, 32,276/68
Int. Cl. A61k 27/00
U.S. Cl. 424—270                                    9 Claims

ABSTRACT OF THE DISCLOSURE

A method of treating various conditions involving inflammation and its concomitant, swelling, tenderness, decreased mobility, pain, and fever, employing a substituted 2-acylaminothiazole as the active anti-inflammatory agent.

CROSS-REFERENCE TO RELATED APPLICATION

This application corresponds to the British Provisional patent application No. 32,276/68, filed July 5, 1968, and entitled "Thiazoles."

BACKGROUND OF THE INVENTION

A number of humans and animals are known to suffer from various rheumatic conditions and various conditions of the skin, involving inflammation and its concomitant, swelling, tenderness, decreased mobility, pain, and fever. While there are a number of anti-inflammatory agents which have been found to be effective in the symptomatic treatment of conditions such as rheumatoid arthritis, rheumatoid spondylitis, degenerative joint diseases, and the like, such agents have been found to have a number of undesirable side effects. Thus, the search for improved anti-inflammatory agents continues.

The present invention provides a method of treating inflammation and the like in humans and animals by employing a substituted 2-acylaminothiazole as the anti-inflammatory agent.

SUMMARY

This invention relates to a method of treating inflammation, and the resulting pain and fever in humans and animals. More particularly, this invention provides a method for treating inflammatory disorders comprising the daily administration of from 5 to 200 mg./kg. of a 2-acylaminothiazole optionally substituted in the 4 or 5 position of the thiazole ring by one or more substituents selected from the class comprising halo, loweralkyl, lower haloalkyl, phenyl, substituted phenyl and carbethoxy groups.

DETAILED DESCRIPTION OF THE INVENTION

According to the method of this invention, symptomatic relief of inflammation and its accompanying swelling, tenderness, decreased mobility, pain, and fever is provided when from 5 to 200 mg./kg. of body weight daily of a substituted 2-acylaminothiazole is administered to humans and animals either orally or interperitoneally.

The substituted 2-acylaminothiazoles useful in treating inflammation according to this invention are represented by the following formula:

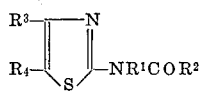

wherein:

$R^1$ is hydrogen or loweralkyl
$R^2$ is loweralkyl or lower haloalkyl; and
$R^3$ and $R^4$ are the same or different members of the group consisting of hydrogen, halo, loweralkyl, lower haloalkyl, phenyl, substituted phenyl, or carbethoxy.

The term "lower alkyl" as employed herein, refers to both straight and branched chain $C_1$–$C_5$ alkyls, including methyl, ethyl, n-propyl, iso-propyl, n-butyl, sec-butyl, tert-butyl, iso-butyl, n-amyl, iso-amyl, neo-pentyl, and the like. The term "halo" refers to chloro, fluoro, bromo, and iodo.

Illustrative of compounds useful in this invention are 2-propionamido-4-chloromethylthiazole,
2-(N-acetylmethylamino)-4-chloromethylthiazole,
2-(N-acetylmethylamino)-4-phenylthiazole,
2-trichloroacetamido-4-methylthiazole,
2-acetamido-4-chloromethyl-5-chlorothiazole,
2-acetamido-4-chloromethyl-5-iodothiazole,
2-acetamido-4-(2-chloroethyl)thiazole,
2-acetamido-4-(2-bromoethyl)thiazole,
2-acetamido-4-(2,5-dichlorophenyl)thiazole,
2-chloroacetamido-4-carbethoxythiazole,
2-propionamido-4-fluoromethylthiazole,
2-ethoxy-carbonylaminothiazole,
2-acetamido-thiazole,
2-dichloroacetamido-thiazole,
2-trichloroacetamido-thiazole,
2-propionamido-thiazole,
2-acetamido-5-methylthiazole,
2-propionamido-5-bromothiazole,
2-acetamido-5-iodothiazole,
2-methoxyacetamido-thiazole,
2-acetamido-5-nitrothiazole,
2-formamido-4-methylthiazole,
2-acetamido-4-methylthiazole,
2-dichloroacetamido-4-methylthiazole,
2-trifluoroacetamido-4-methylthiazole,
2-chloroacetamido-4-chloromethylthiazole,
2-acetamido-4-methyl-5-bromothiazole,
2-cinnamoylamido-4-methylthiazole,
2-acetamido-4-chloromethylthiazole,
2-chloroacetamido-4-chloromethylthiazole,
2-acetamido-4-isopropylthiazole,
2-acetamido-4-phenylthiazole,
2-acetamido-5-chlorothiazole.

In the practice of this invention, the preferred compounds are those wherein loweralkyl is $C_1$–$C_2$.

The compounds of this invention can be prepared by methods well known in the art. For example, where substituents other than hydrogen are desired at the 4 or 5 positions in the thiazole ring, the standard thiazole synthesis from the appropriate ketone and thiourea may be employed. Alternatively, these substituents can be introduced after the thiazole ring has been formed by, for example, halogenating the ring.

The acyl group, —COR², can be introduced into the compounds of this invention by acylation of the appropriate 2-amino-thiazole by methods well known in the art.

Where $R^1$ represents a loweralkyl group, the compounds employed in this invention can be produced by alkylating the corresponding acid amide. The following specific examples further illustrate the preparation of compounds useful in treating inflammation according to this invention.

Example 1.—2-propionamido-4-chloromethylthiazole

One and nine-tenths grams of 2-amino-4-chloromethyl-thiazole hydrochloride and 10 ml. of freshly distilled propionic anhydride were heated under gentle reflux for 30 minutes, and the excess of the anhydride was evaporated under reduced pressure at 50° C. Recrystallization of the residue from ethanol-petroleum ether (B.P., 60–80° C.) yielded 1.2 g. of white, crystalline 2-propionamido-4-chloromethylthiazole, M.P., 129–131° C.

*Analysis.*—Calc. for C₇H₉ClN₂OS (percent): C, 41.1; H, 4.4; N, 13.7. Found (percent): C, 40.9; H, 4.4; N, 14.0.

Example 2.—2-(N-acetylmethylamino)-4-chloromethylthiazole

A hot solution of 18.0 g. of N-methylthiourea in 500 ml. of acetone was added dropwise during a one hour period to a stirred solution of 25.4 g. of 1,3-dichloroacetone in 100 ml. of acetone. Stirring was continued at room temperature for 3 hours, and the acetone solution was then decanted from the solid. The latter was dissolved in 200 ml. of ethanol and reprecipitated by the addition of 400 ml. of petroleum ether (B.P., 60–80° C.). Filtration afforded 17.5 g. of white prisms which were hydroscopic. Thirteen and one-half grams of these prisms were heated in 40 ml. of acetic anhydride at 100° C. for 1.5 hours, and the excess anhydride was evaporated under reduced pressure at 50°. The residue was recrystallized from ethanol to yield 7.3 g. of 2 - (N-acetylmethylamino)-4-chloromethylthiazole as white plates, M.P., 140–141° C.

*Analysis.*—Calc. for C₇H₉ClN₂OS (percent): C, 41.1; H, 4.4; N, 13.7. Found (percent): C, 41.0; H, 3.9; N, 13.9.

Example 3.—2-(N-acetylmethylamino)-4-phenylthiazole

Two and two-tenths grams of 2-acetamido-4-phenylthiazole were added to a suspension of 0.4 g. of sodamide in 15 ml. of dry dioxane. The reaction mixture was stirred under reflux for 7.5 hours. To the reaction mixture were added 3.2 ml. of methyl iodide, and refluxing was continued for 8 hours. The mixture was evaporated to dryness under reduced pressure, and the residue was stirred with 25 ml. of water. The insoluble portion was filtered off and recrystallized from ethanol to yield 0.5 g. of 2-(N-acetylmethylamino)-4-phenylthiazole, M.P. 148–150° C.

*Analysis.*—Calc. for C₁₂H₁₂N₂OS (percent): C, 62.0; H, 5.2; N, 12.1. Found (percent): C, 62.5; H, 5.3; N, 11.9.

Example 4.—2-trichloroacetamido-4-methylthiazole

Eighteen and two-tenths grams of trichloroacetyl chloride were added dropwise during 1 hour to a stirred solution of 11.4 g. of 2-amino-4-methylthiazole and 7.9 g. of pyridine in 60 ml. of toluene. Stirring was continued overnight at room temperature, and the reaction mixture was then poured into 250 ml. of water. The resulting emulsion was centrifuged, and the aqueous layer was separated and discarded. The remainder was evaporated to dryness under reduced pressure, and the residue recrystallized from ethanol to yield 14.7 g. of 2-trichloroacetamido-4-methylthiazole, M.P., 206–109° C. (d).

*Analysis.*—Calc. for C₆H₅Cl₃N₂OS (percent): C, 27.8; H, 1.95; N, 10.8. Found (percent): C, 27.9; H, 2.00; N, 10.8.

Example 5.—2-acetamido-4-chloromethyl-5-chlorothiazole

To a stirred suspension of 8.5 g. of 2-acetamido-4-chloromethylthiazole (0.045 mole) in 100 ml. of carbon tetrachloride were added 4.05 ml. of sulfuryl chloride. Stirring was continued overnight at room temperature. The mixture was filtered, and the solid was recrystallized twice from ethanol to yield 4.3 g. of white needles of 2-acetamido - 4 - chloromethyl - 5 - chlorothiazole, M.P. 226–228° C.

*Analysis.*—Calc. for C₆H₆Cl₂N₂OS (percent): C, 32.2; H, 2.7; N, 12.5. Found (percent): C, 31.8; H, 2.7; N, 12.5.

Example 6.—2-acetamido-4-(2-chloroethyl)thiazole

Four and three-tenths grams of 2-amino-4-(2-chloroethyl)thiazole and 15 ml. of acetic anhydride were heated at 100° C. for one hour, and the excess of anhydride was evaporated under reduced pressure at 50° C. The residue was crystallized twice from ethanol yielding 3.3 g. of cream colored crystals of 2-acetamido-4-(2-chloroethyl)thiazole, M.P., 163–165° C.

*Analysis.*—Calc. for C₇H₉ClN₂OS (percent): C, 41.1; H, 4.4; N, 13.7. Found (percent): C, 41.3; H, 4.5; N, 13.9.

Example 7.—2-acetamido-4-(2,5-dichlorophenyl)thiazole

A mixture of 16.2 g. of 2,5-dichloroacetophenone, 15.0 g. of thiourea, and 21.8 g. of iodine was heated at 120° C. for 3 days. The cooled solid was triturated four times with 250 ml. of ether, dissolved in the minimum amount of boiling water, treated with charcoal, and basified with an excess of ammonium hydroxide solution. 2-amino-4-(dichlorophenyl)thiazole separated from the aqueous solution and was filtered off and recrystallized from ethanol to give 9.9 g. of white needles, M.P. 170–171° C. Five grams of the white needles were heated with 25 ml. of acetic anhydride under gentle reflux for 2 hours, and the excess of anhydride was removed under reduced pressure. The residue was recrystallized from dimethylformamide-water to yield 3.7 g. of 2-acetamido-4-(2,5-dichlorophenyl)thiazole as white crystals, M.P. 259–260° C.

*Analysis.*—Calc. for C₁₁H₈Cl₂N₂OS (percent): C, 46.0; H, 2.8; N, 9.75. Found (percent): C, 45.6; H, 3.0; N, 9.7.

Example 8.—2-chloroacetamido-4-carbethoxythiazole

Nine and seven-tenths grams of 2-amino-4-carbethoxythiazole and 24.0 g. of chloroacetic anhydride were heated at 120° C. for 1.5 hours. The reaction mixture was then poured into 200 ml. of water, and the solid was filtered off. Recrystallization from ethanol yielded 5 g. of 2-chloroacetamido-4-carbethoxythiazole, M.P., 213–215° C.

*Analysis.*—Calc. for C₈H₉ClN₂OS (percent): C, 38.8; H, 3.6; N, 11.25. Found (percent): C, 39.3; H, 3.8; N, 11.40.

The present invention includes within its scope pharmaceutical compositions comprising, as an active ingredient, at least one of the compounds of this invention in association with a phamaceutical carrier or diluent. The compounds of this invention exhibit both oral and parenteral activity and can be formulated in dosage forms for oral, parenteral, rectal, or topical administration.

Solid dosage forms for oral administration include capsules, tablets, pills, powders, and granules. In such solid dosage forms, the active compound is admixed with at least one inert diluent such as sucrose, lactose, or starch. Such dosage forms can also comprise, as is normal practice, additional substances other than inert diluents, e.g., lubricating agents such as magnesium stearate. In the case of capsules, tablets and pills, the dosage forms may also comprise buffering agents. Tablets and pills can additionally be prepared with enteric coatings.

Liquid dosage forms for oral administration include pharmaceutically acceptable emulsions, solutions, suspensions, syrups, and elixirs containing inert diluents commonly used in the art, such as water. Besides inert diluents, such compositions can also include adjuvants, such as wetting agents, emulsifying and suspending agents, and sweetening, flavoring, and perfuming agents.

Preparations according to this invention for parenteral administration include sterile aqueous or non-aqueous solutions, suspensions, or emulsions. Examples of non-aqueous solvents or vehicles are propylene glycol, polyethylene glycol, vegetable oils, such as olive oil, and injectable organic esters such as ethyl oleate. Such dosage forms may also contain adjuvants such as preserving, wetting, emulsifying, and dispersing agents. They may be sterilized by, for example, filtration through a bacteria-retaining filter, by incorporating sterilizing agents into the compositions, by irradiating the compositions, or by heating the compositions. They can also be manufactured in the form of sterile solid compositions which can be dissolved in sterile water, or some other sterile injectable medium immediately before use.

Compositions for rectal administration are suppositories which may contain, in addition to the active substance, excipients such as cocoa butter or a suppository wax.

The dosage of active ingredient in the compositions of this invention may be varied; however, it is necessary that the amount of the active ingredient shall be such that a suitable dosage form is obtained. The selected dosage depends upon the desired therapeutic effect, on the route of administration, and on the duration of the treatment. Generally, dosage levels of between 5.0 and 200 mg./kg. of body weight daily are administered to mammals to obtain effective relief of inflammation, pain, and fever. The exact dosage level and mode of administration will vary, depending upon the nature and severity of the inflammatory condition being treated. Oral administration is usually preferred because of the convenience afforded by this method of treatment.

The total daily requirement of the active ingredient can be provided in a single dose or in smaller divided doses given at intervals throughout the day. Because of the more uniform relief provided when the active agent is administered periodically throughout the day, it is generally preferred to provide the required amount of the compounds employed in the method of this invention in divided doses.

Where the inflammatory condition involves primarily skin surfaces, topical administration of the active compounds employed in this invention is preferred. Conventional ointment and cream bases provide suitable vehicles for the active agents for topical administration.

The following examples further illustrate the pharmaceutical compositions which are a feature of this invention.

Example 9

Tablets weighing 500 mg. and having the following compositions are prepared:

| | Mg. |
|---|---|
| 2-propionamido-4-chloromethylthiazole | 250 |
| Starch | 190 |
| Colloidal silica | 50 |
| Magnesium stearate | 10 |

Example 10

Tablets weighing 200 mg. and having the following compositions are prepared:

| | Mg. |
|---|---|
| 2-(N-acetylmethylamino)-4-chloromethylthiazole | 50 |
| Starch | 120 |
| Colloidal silica | 27 |
| Magnesium stearate | 3 |

Tablets analogous to those described in Examples 9 and 10 can be prepared by replacing the above active ingredients by the same weight of any other compound coming within the scope of this invention. Such tablets can be enteric coated and can additionally comprise buffering agents and the like.

I claim:

1. A method of treating inflammation in a mammal which comprises administering to said mammal between 5.0 mg./kg. to 200 mg./kg. of body weight daily of a compound of the formula:

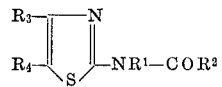

wherein:
$R^1$ is hydrogen or lower alkyl;
$R^2$ is lower alkyl or lower haloalkyl; and
$R^3$ and $R^4$ are the same or different members selected from the group consisting of hydrogen, halogen, lower alkyl, lower haloalkyl, phenyl, halophenyl and carbethoxy.

2. A method in accordance with claim 1 wherein the compound is 2-trichloroacetamido-4-methylthiazole.

3. A method in accordance with claim 1 wherein the compound is 2-acetamido-4-chloromethyl-5-chlorothiazole.

4. A method in accordance with claim 1 wherein the compound is 2-acetamido-thiazole.

5. A method in accordance with claim 1 wherein the compound is 2-propionamido-thiazole.

6. A method in accordance with claim 1 wherein the compound is 2-acetamido-4-methylthiazole.

7. A method in accordance with claim 1 wherein the compound is 2-acetamido-4-chloromethylthiazole.

8. A method in accordance with claim 1 wherein the compound is 2-acetamido-4-phenylthiazole.

9. A method in accordance with claim 1 wherein the compound is 2-acetamido-5-chlorothiazole.

References Cited

UNITED STATES PATENTS 2,735,798   2/1956   Kupferbery et al. ____ 424—270

OTHER REFERENCES

Chem. Abst. (1), 52, 4641a (1958).
Chem. Abst. (2), 54, 4542b (1960).

STANLEY J. FRIEDMAN, Primary Examiner